United States Patent
Carlstrom, Jr.

(10) Patent No.: US 6,200,698 B1
(45) Date of Patent: Mar. 13, 2001

(54) END PLATE ASSEMBLY HAVING A TWO-PHASE FLUID-FILLED BLADDER AND METHOD FOR COMPRESSING A FUEL CELL STACK

(75) Inventor: Charles M. Carlstrom, Jr., Clifton Park, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/371,818

(22) Filed: Aug. 11, 1999

(51) Int. Cl.⁷ .............................. H01M 8/02; H01M 2/02
(52) U.S. Cl. ................................. 429/34; 429/38
(58) Field of Search .................. 429/34, 37, 38, 429/12

(56) References Cited

U.S. PATENT DOCUMENTS

| | | | |
|---|---|---|---|
| 4,389,466 | 6/1983 | Joy | 429/27 |
| 4,477,540 | * 10/1984 | Miller | 429/27 |
| 4,692,391 | * 9/1987 | Hirota | 429/34 |
| 4,973,531 | 11/1990 | Zaima et al. | 429/37 |
| 5,030,524 | * 7/1991 | Stadnick | 429/66 |
| 5,409,787 | * 4/1995 | Blayner | 429/66 |
| 5,419,980 | 5/1995 | Okamoto et al. | 429/32 |
| 5,441,825 | 8/1995 | Barlow | 429/66 |
| 5,484,666 | * 1/1996 | Gibb | 429/34 |
| 5,534,362 | 7/1996 | Okamoto et al. | 429/32 |
| 5,547,776 | 8/1996 | Fletcher et al. | 429/13 |
| 5,618,641 | * 4/1997 | Arias | 429/210 |
| 5,686,200 | * 11/1997 | Barton | 429/37 |
| 5,736,269 | 4/1998 | Okamoto et al. | 429/32 |
| 5,773,160 | 6/1998 | Wilkinson et al. | 429/13 |
| 5,858,569 | 1/1999 | Meacher et al. | 429/26 |
| 5,993,987 | * 11/1999 | Wozniczka | 429/37 |
| 6,057,053 | * 5/2000 | Gibb | 429/37 |

FOREIGN PATENT DOCUMENTS 58-53166  3/1983  (JP).

* cited by examiner

*Primary Examiner*—Carol Chaney
*Assistant Examiner*—Mark Ruthkosky
(74) *Attorney, Agent, or Firm*—Heslin & Rothenberg, P.C.

(57) ABSTRACT

An end plate assembly is disclosed for use in a fuel cell assembly in which the end plate assembly includes a housing having a cavity, and a bladder receivable in the cavity and engageable with the fuel cell stack. The bladder includes a two-phase fluid having a liquid portion and a vapor portion. Desirably, the two-phase fluid has a vapor pressure between about 100 psi and about 600 psi at a temperature between about 70 degrees C. to about 110 degrees C.

24 Claims, 4 Drawing Sheets

END PLATE ASSEMBLY HAVING A TWO-PHASE FLUID-FILLED BLADDER AND METHOD FOR COMPRESSING A FUEL CELL STACK

STATEMENT OF GOVERNMENT RIGHTS

The Government of the United States of America has rights in this invention pursuant to Contract No. DE.FCOI.97EE50472 awarded by the U.S. Department of Energy.

TECHNICAL FIELD

This invention relates generally to fuel cell assemblies, and more particularly to an end plate assembly for compressing a fuel cell stack.

BACKGROUND INFORMATION

Fuel cells electrochemically convert fuels and oxidants to electricity. Fuel cells are employed in many environments, for example, automotive, aerospace, industrial, etc. Unlike a battery, which contains a set amount of chemicals for generating electricity and which stops delivering electricity once the chemicals are consumed, a fuel cell can deliver electricity continuously so long as it receives fuel and oxidant.

Fuel cells are generally categorized according to the type of electrolyte (e.g., solid oxide, molten carbonate, alkaline, phosphoric acid, or solid polymer) used to accommodate ion transfer during operation.

For example, a solid polymer electrochemical fuel cell generally comprises an MEA (membrane electrode assembly). The MEA includes a solid polymer membrane or PEM (proton exchange membrane) sandwiched between and in contact with two electrodes (one called an anode and the other called a cathode) made of porous, electrically conducting sheet material. The electrodes are typically made from carbon fiber paper or cloth. In addition, at the interface of the electrode and membrane, i.e., sandwiched therebetween, is a platinum-based catalyst layer to facilitate the electrochemical reaction.

Typically, the MEA is placed between two electrically conductive graphite plates which have one or more reactant flow passages impressed on the surface. The reactant flow passages direct the flow of a reactant (e.g., fuel or oxidant) to the electrode. Additional cells can be connected together in series to form a fuel cell stack having increased voltage and power output. Such a fuel cell stack is typically provided with inlets, outlets, and manifolds for directing the flow of the reactants (as well as coolant, such as water) to the individual reactant flow plates.

Fuel, such as hydrogen, is supplied to the anode side of the fuel cell where the hydrogen reacts at the platinum-based anode catalyst layer to separate into hydrogen ions and electrons, as follows (anode reaction):

$$H_2 \rightarrow 2H^+ + 2e^-$$

The solid polymer membrane permits the passage of protons (i.e., $H^+$ ions) from the anode side of the fuel cell to the cathode side of the fuel cell while preventing passage therethrough of reactant fluids (e.g., hydrogen and air/oxygen gases). The electrons migrate via an external circuit in the form of electricity.

An oxidant, such as oxygen or oxygen containing air, is supplied to the cathode side of the fuel cell where it reacts at the platinum-based cathode catalyst layer with the hydrogen ions that have crossed the membrane and the electrons from the external circuit to form liquid water as a reaction product, as follows (cathode reaction):

$$\tfrac{1}{2}O_2 + 2H^+ + 2e^- \rightarrow H_2O$$

Typically, a plurality of fuel cells are assembled between a pair of thick rigid end plates. The edges of the end plates are bolted together to apply a compressive force on the plurality of fuel cells. A problem with a fuel cell assembly having thick rigid end plates is that the thick end plates increase the weight of the fuel cell assembly.

Another problem with such end plates is that they have a tendency to deflect when bolted together so that an unevenly distributed compressive force is applied to the plurality of fuel cells.

One approach has been to assemble a fuel cell stack with one or more end plates having a bladder filled with a gas such as nitrogen or a liquid such as oil to facilitate distribution of forces applied to the plurality of fuel cells. End plates having such a bladder may have a tendency to leak over time thereby reducing the gas or liquid therein. This may result in a reduced stack compression pressure applied to the plurality of fuel cells, reduced power output, and thus may require periodic maintenance.

SUMMARY OF THE INVENTION

In one aspect of the present invention, an end plate assembly is provided for use in a fuel cell assembly having a fuel cell stack in which the end plate assembly includes a housing having a cavity, and a bladder receivable in the cavity and engageable with the fuel cell stack. The bladder includes a two-phase fluid having a liquid portion and a vapor portion.

For example, the two-phase fluid may have a vapor pressure between about 25 psi and about 1000 psi at a temperature of between about 20 degrees C. and about 110 degrees C. The two-phase fluid may include, for example, ammonia, trichlorofluoromethane, propane, propylene, or a combination thereof.

In another aspect of the present invention, a fuel cell assembly is provided having a plurality of fuel cells forming a fuel cell stack, and a first end plate assembly fixedly attachable to an opposite end plate for compressing the fuel cell stack therebetween. The end plate assembly includes a bladder containing a two-phase, for example, as noted above. In addition, the opposite end plate may also include a second end plate assembly having a bladder containing a two-phase fluid, for example, as noted above.

In yet another aspect of the present invention, a method is provided for compressing a fuel cell stack which comprises compressing the fuel cell stack between a first end plate assembly and an opposite end plate. The end plate assembly includes a bladder containing a two-phase fluid, for example, as noted above. The method may also include evacuating the bladder and introducing the two-phase fluid into the bladder.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be understood from the following detailed description of preferred embodiments taken in conjunction with the accompanying drawings in which:

DETAILED DESCRIPTION OF THE PREFERRED EMBODIMENTS

Figure 1:
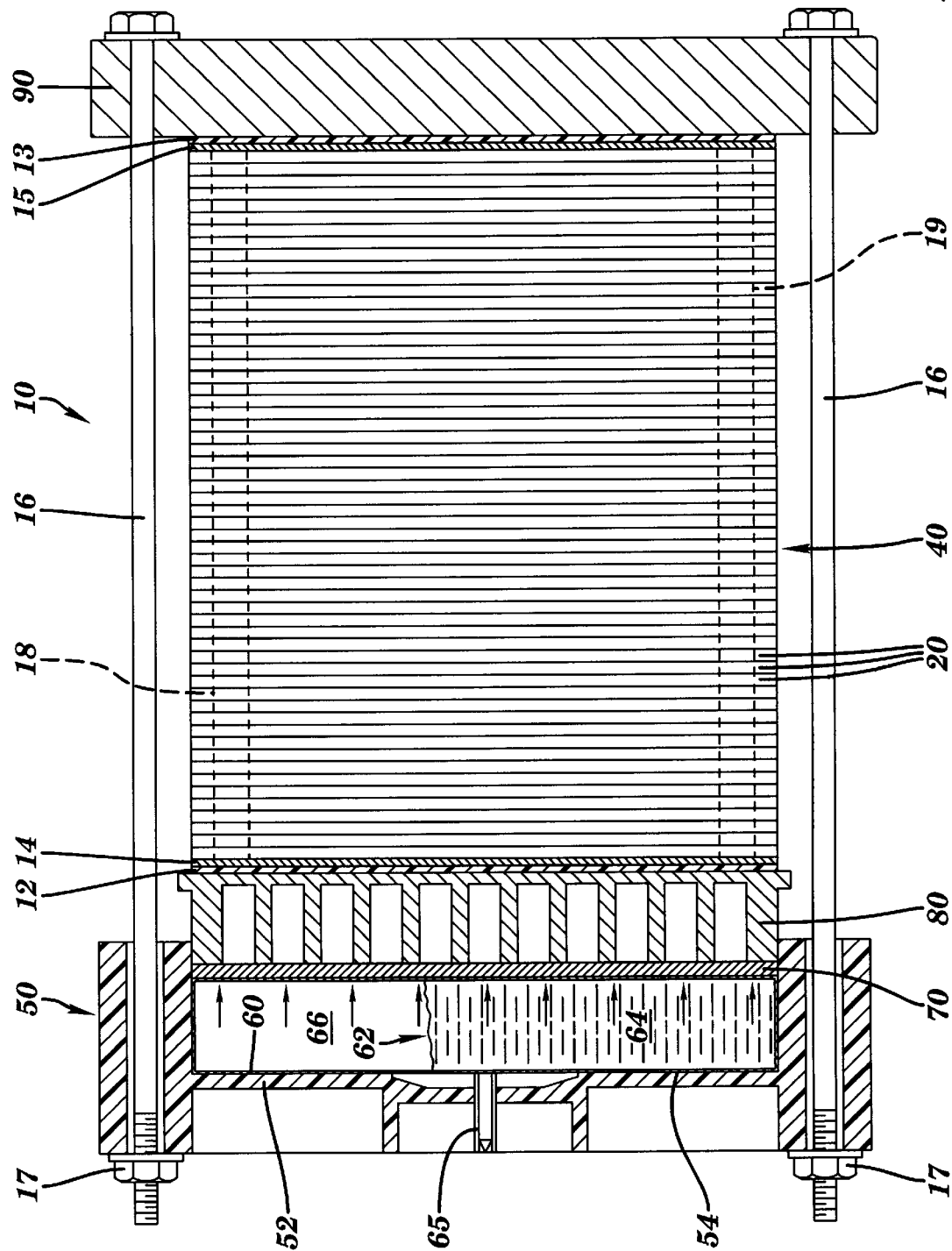
FIG. 1 is a side elevational view of a fuel cell assembly having an end plate assembly with a two-phase, fluid-filled bladder.

FIG. 1 illustrates a fuel cell assembly 10 according to the present invention. In this exemplary embodiment, fuel cell assembly 10 includes a plurality of fuel cells 20 forming a fuel cell stack 40. An end plate assembly 50 is fixedly attachable to an opposite end plate 90 for compressing fuel cell stack 40 therebetween. As described in greater detail below, end plate assembly 50 comprises a sealed bladder 60 containing a two-phase fluid 62 operable to maintain, over an extended period of time, a generally uniformly distributed stack compression pressure or compressive force on fuel cell stack 40.

More specifically, in this exemplary embodiment, fuel cell assembly 10 desirably includes insulation layers 12 and 13, and current collector/conductor plates 14 and 15, disposed between end plate assembly 50 and end plate 90, respectively, and the ends of fuel cell stack 40. A plurality of structural members such as elongated bolts 16 and releasably attachable nuts 17 may be employed to inhibit movement of end plate assembly 50 away from end plate 90.

Figure 2:
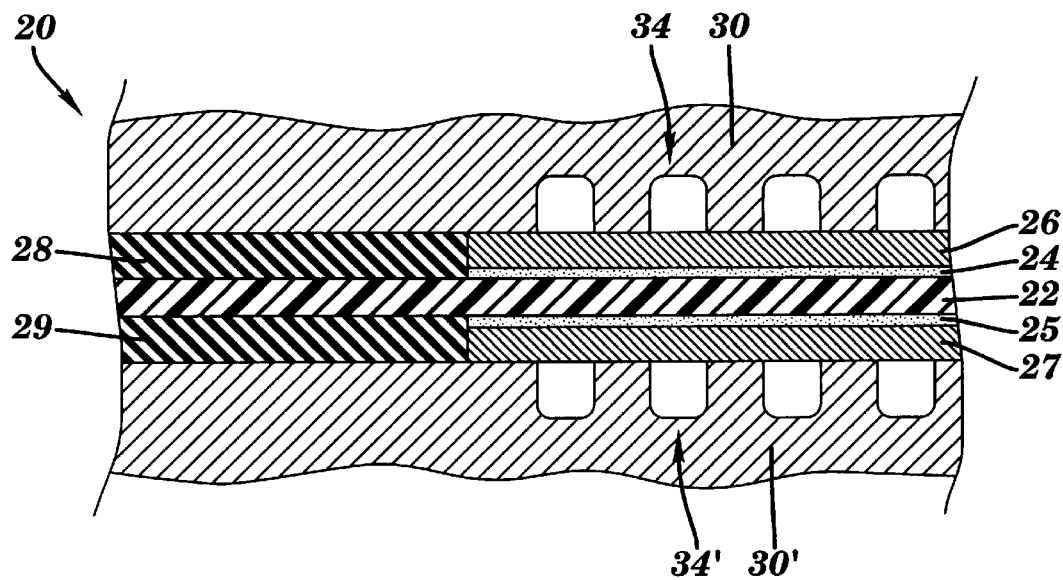
FIG. 2 is a cross-sectional view of one of the fuel cells of the fuel cell assembly shown in FIG. 1.

With reference to FIG. 2, a typical fuel cell 20 may include a solid polymer membrane 22 or PEM (proton exchange membrane) such as a material manufactured by E.I. Du Pont de Nemours Company and sold under the trademark NAFION®. Catalysts 24 and 25 (e.g., platinum), which facilitate chemical reactions, are desirably applied to the anode and cathode sides, respectively, of the solid polymer electrolyte. Anode and cathode gas diffusion layers 26 and 27, which can be formed from a resilient and conductive material such as carbon fabric or carbon fiber paper, are disposed on catalysts 24 and 25, respectively.

Figure 3:
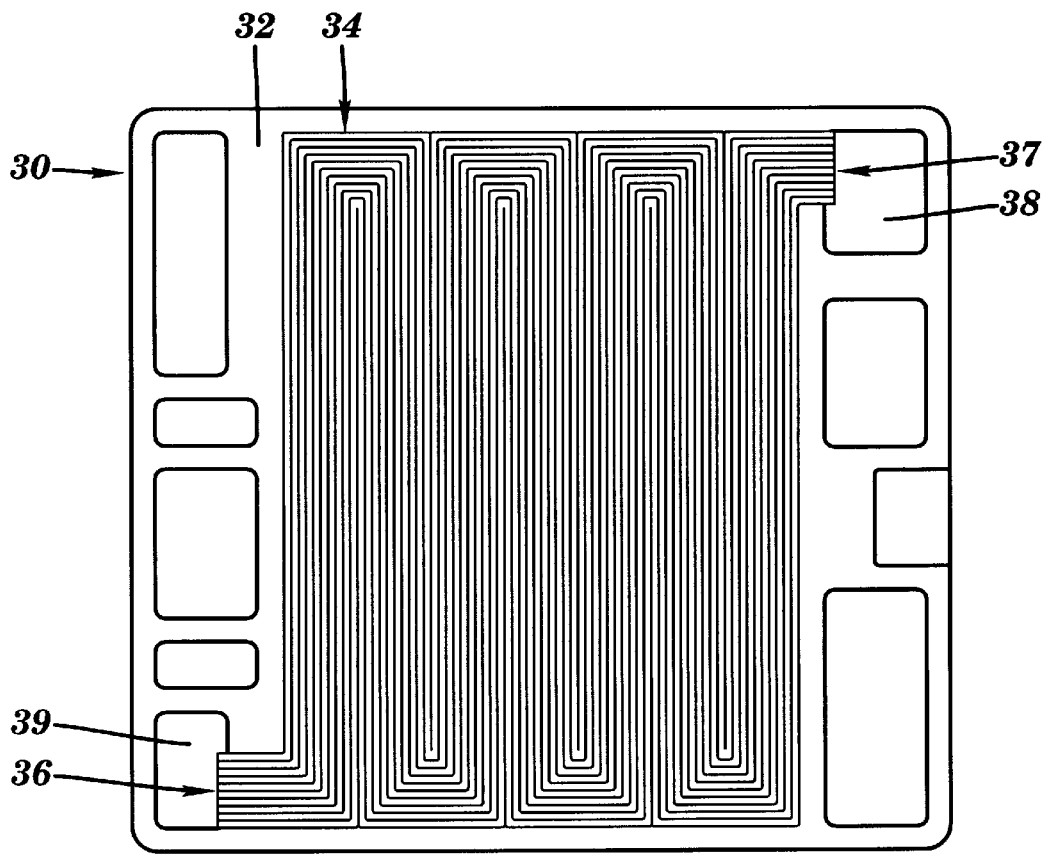
FIG. 3 is a plan view of a surface of a fluid flow plate for distributing a reactant gas over an active region of the fuel cell shown in FIG. 2.

Exemplary fuel cell 20 further includes a first fluid flow plate 30, best shown in FIG. 3, having a fluid flow face 32 with a plurality of serpentine flow channels 34 thereon. Flow channels 34 receive and transmit one or more fluids through an inlet 36 and out an outlet 37 which are in fluid communication with and open onto corresponding passageways 38 and 39, respectively, which form respective portions of fluid manifolds 18 and 19 (FIG. 1). Fluid flow plate 30 may be monopolar or bipolar.

With reference again to FIG. 2, flow channel 34 carries reactant gas, e.g., a fuel such as hydrogen, as well as a liquid, e.g., humidification. A second flow plate 30', is essentially similar to first flow plate 30, and includes flow channels 34' for carrying reactant gas, e.g., an oxidant such as air/oxygen as well as a liquid, e.g., humidification and/or product water.

Desirably, gaskets 28 and 29 are employed to seal passageways 38 and 39 (FIG. 3). Gaskets 28 and 29 may include a frame gasket made from a polytetrafluoroethylene ("PTFE") material manufactured by E.I. Du Pont de Nemours Company and sold under the trademark TEFLON®. Alternatively, multiple O-ring gaskets might be employed.

With reference again to FIG. 1, fuel cell stack 40 may contain one or more (e.g., one hundred and eight) PEM-type fuel cells 20. By connecting an external load (not shown) between electrical contacts (not shown) of current collector/conductor plates 14 and 15, one can complete a circuit for use of current generated by the one or more PEM-type fuel cells.

PEM-type fuel cell stack 40 is desirably suitably cooled to operate at a temperature between about 20 degrees C. (ambient) and about 110 degrees C., and preferably between about 70 degrees C. and about 110 degrees C. In addition, in the fabrication of fuel cell assembly 10, fuel cell stack 40 typically has applied thereto a stack compression pressure of between about 25 psi (pounds per square inch) and about 1,000 psi, and preferably, between about 100 psi and about 600 psi.

Figure 4:
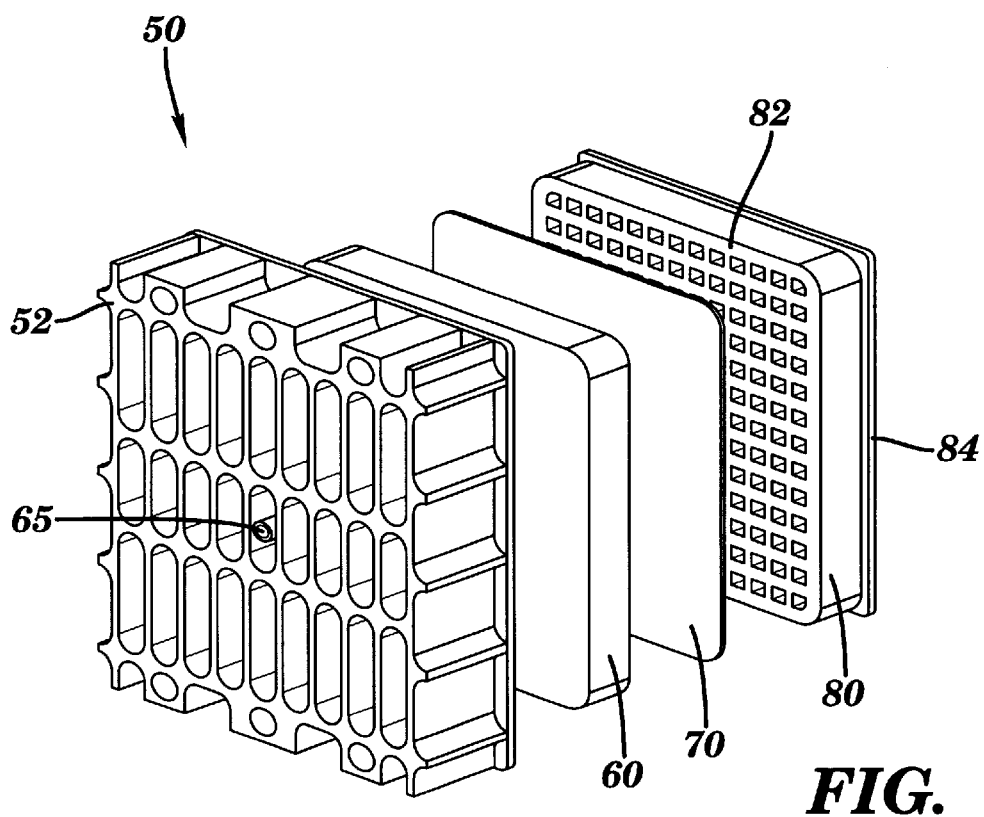
FIG. 4 is an exploded perspective view of the end plate assembly shown in FIG. 1.

As best shown in FIGS. 1 and 4, end plate assembly 50 includes a housing 52 having a cavity 54 (FIG. 1) for receiving bladder 60, a seal plate 70, and a plunger 80. Desirably, housing 52 is formed from a plastic material such as RYTON polyphenylene sulfide (PPS), manufactured by Phillips Chemical Company of Bartlesville, Okla., which allows the end plate assembly to be lightweight. Housing 52 may also be made of other suitable materials, as will be appreciated by those of ordinary skill in the art.

Plunger 80 is desirably partially receivable within cavity 54 and includes a first surface 82 (FIG. 4) which engages seal plate 70 which, in turn, engages bladder 60, and a second surface 84 (FIG. 4) which engages one end of fuel cell stack 40. Advantageously, housing 52 need not be rigid and thus may flex or bend relative to bladder 60 when compressing fuel cell stack 40. Bladder 60 is desirably fabricated from a rubber or elastomeric material allowing bladder 60 to be flexible and to uniformly distribute clamping forces applied to seal plate 70, plunger 80, and ultimately to, fuel cell stack 40.

Bladder 60 desirably includes a releasably sealable port 65 for introducing into bladder 60, i.e., a chamber or reservoir therein, two-phase fluid 62 having a liquid portion 64 and a gas or vapor portion 66. In addition, the two-phase fluid may have a vapor pressure as described in greater detail below.

Vapor pressure is the pressure exerted when a liquid is in equilibrium with its own vapor. For example, if a liquid is introduced into an evacuated vessel at a given temperature, some of the liquid will vaporize, and the pressure of the vapor will attain a maximum value which is termed the vapor pressure of the liquid at that temperature. Vapor pressure is a function of the substance and of the temperature.

Figure 5:
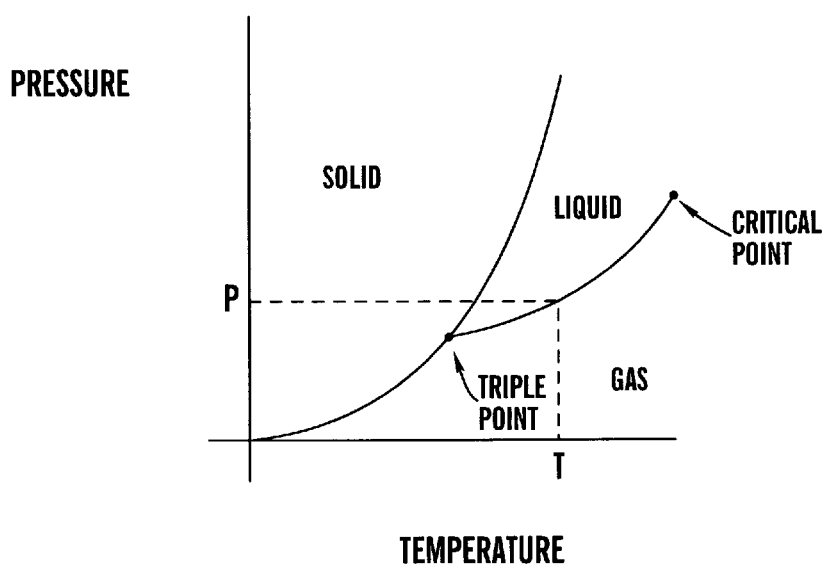
FIG. 5 is a phase diagram of the two-phase fluid in which the lines indicate the temperature and pressures at which phase changes occur.

FIG. 5 is an exemplary phase diagram (pressure vs. temperature) of a substance indicating the temperatures and pressures at which phase changes occur.

Use of a two-phase fluid, e.g., liquid portion 64 and vapor portion 66, results in bladder 60 being pressurized even if gas slowly leaks from bladder 60, i.e., part of the liquid reservoir will change phase to a gas. For example, if fifty percent of the volume of the bladder starts as a liquid, there will be a significant reservoir of gas stored in the bladder. A benefit of the two-phase fluid-filled bladder is that the reservoir is part of the bladder requiring no external hardware. In addition, since the density of the liquid is greater than the gas, the reservoir is very space efficient.

Desirably, a two-phase fluid is chosen having a vapor pressure P (FIG. 5) between about 25 psi and about 100 psi at a temperature T (FIG. 5) between about 20 degrees C. and about 110 degrees C., e.g., at the desired operating fuel cell stack temperature and fuel cell stack compression pressure. Preferably, the two-phase fluid has a vapor pressure between about 100 psi and 600 psi at a temperature of about 70 degrees C. to about 110 degrees C. Suitable two-phase fluids for use in fuel cell assembly 10 may include ammonia, trichlorofluoromethane, propane, and propylene. The following tables illustrate the vapor pressure at a given temperature for these two-phase fluids.

| Temperature (Degrees C) | Vapor Pressure (PSI) |
|---|---|
| AMMONIA ($NH_3$) | |
| 70 | 480 |
| 80 | 601 |
| 90 | 743 |
| 100 | 908 |
| 110 | 1100 |
| TRICHLOROFLUOROMETHANE ($CCl_3F$) (Fluorocarbon-11) | |
| 108 | 146 |
| PROPANE ($C_3H_8$) | |
| 95 | 588 |
| PROPYLENE ($C_3H_6$) | |
| 85 | 588 |

From the present description, it will be appreciated by those skilled in the art that two or more substances, e.g., two or more different two-phase fluids, may be combined so that the vapor pressure may be tailored to result in a desired clamping force or stack compression pressure to be applied to the fuel cell stack at the operating temperature of the fuel cell stack. In manufacturing fuel cell assembly 10, the hardware, e.g., the fuel cell stack and the end plates, may be assembled first, and then the bladder may be evacuated prior to introducing a suitable two-phase fluid to provide a liquid portion and a gas portion in the bladder.

Figure 6:
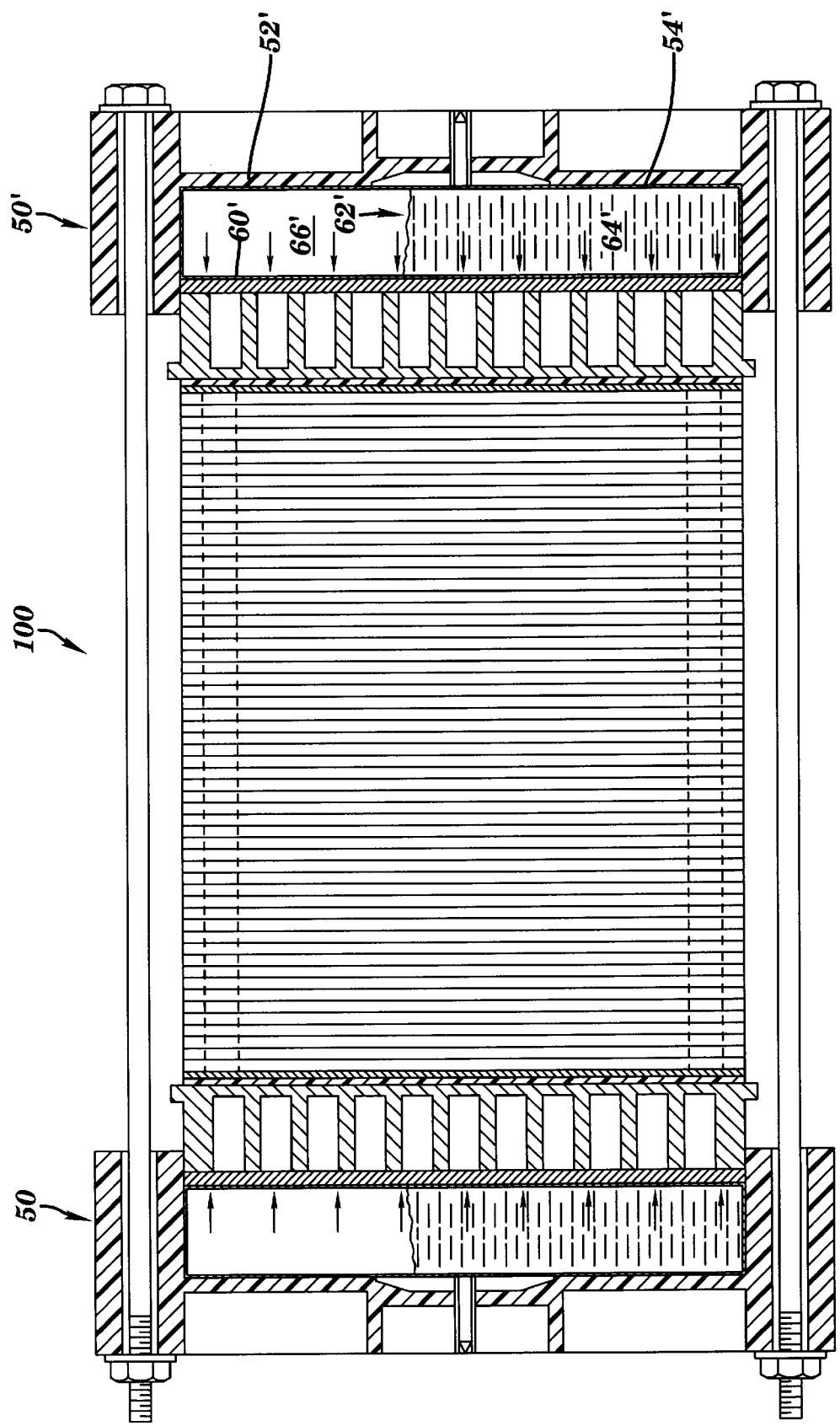
FIG. 6 is a side elevational view of a fuel cell assembly having a pair of end plate assemblies, each with a two-phase, fluid-filled bladder.

As shown in FIG. 6, a fuel cell assembly 100 includes a pair of end plate assemblies 50 and 50'. In this exemplary embodiment, each end plate assembly 50 and 50' includes a two-phase, fluid-filled bladder 60 and 60' having a two-phase fluid 62 and 62' comprising a liquid portion 64 and 64' and a vapor portion 66 and 66', respectively.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An end plate assembly for use in a fuel cell assembly having a fuel cell stack having an operating temperature and pressure, said end plate assembly comprising:
   a housing having a cavity;
   a bladder receivable in said cavity and engageable with the fuel cell stack; and,
   wherein said bladder comprises a two-phase fluid having a liquid/vapor phase transition at the operating temperature and pressure of the fuel cell stack.

2. The end plate assembly of claim 1 wherein said two-phase fluid comprises a vapor pressure between about 25 psi and about 1000 psi at a temperature between about 20 degrees C. to about 110 degrees C.

3. The end plate assembly of claim 2 wherein said two-phase fluid comprises a vapor pressure between about 100 psi and about 600 psi at a temperature between about 70 degrees C. to about 110 degrees C.

4. The end plate assembly of claim 1 wherein said two-phase fluid comprises a two-phase fluid selected from the group consisting of ammonia, trichlorofluoromethane, propane, and propylene.

5. The end plate assembly of claim 1 wherein said two-phase fluid comprises at least two different two-phase fluids.

6. The end plate assembly of claim 1 wherein said housing is formed from a plastic.

7. The end plate assembly of claim 1 further comprising a plunger partially receivable within said cavity and having a first surface engageable with said bladder and a second surface engageable with an end of the fuel cell stack.

8. The end plate assembly of claim 1 wherein said bladder comprises a releasably sealable port for introducing said two-phase fluid.

9. A fuel cell assembly comprising:
   a plurality of fuel cells forming a fuel cell stack having an operating temperature and pressure;
   a first end plate assembly fixedly attachable to an opposite end plate for compressing said fuel cell stack therebetween; and
   said end plate assembly comprising a bladder containing a two-phase fluid having a liquid/vapor phase transition at said operating temperature and pressure of said fuel cell stack.

10. The fuel cell assembly of claim 9 wherein said two-phase fluid comprises a vapor pressure between about 25 psi and about 1000 psi at a temperature between about 20 degrees C. to about 110 degrees C.

11. The fuel cell assembly of claim 10 wherein said two-phase fluid comprises a vapor pressure between about 100 psi and about 600 psi at a temperature between about 70 degrees C. to about 110 degrees C.

12. The fuel cell assembly of claim 9 wherein said two-phase fluid comprising a two-phase fluid selected from the group consisting of ammonia, trichlorofluoromethane, propane, and propylene.

13. The fuel cell assembly of claim 9 wherein said two-phase fluid comprises at least two different two-phase fluids.

14. The fuel cell assembly of claim 9 wherein said first end plate assembly comprises a housing having a cavity for receiving said bladder.

15. The fuel cell assembly of claim 14 wherein said housing is formed from a plastic.

16. The fuel cell assembly of claim 14 wherein said first end plate assembly further comprises a plunger partially receivable within said cavity and having a first surface engageable with said bladder and a second surface engageable with an end of said fuel cell stack.

17. The fuel cell assembly of claim 9 wherein said bladder comprises a releasably sealable port for receiving said two-phase fluid.

18. The fuel cell assembly of claim 9 wherein said fuel cells comprise a solid polymer electrolyte membrane.

19. The fuel cell assembly of claim 9 wherein said opposite end plate comprises a second end plate assembly having a second bladder containing a two-phase fluid.

20. The fuel cell assembly of claim 9 wherein said second end plate comprises a plastic housing having a cavity for receiving said second bladder.

21. A method for compressing a fuel cell stack having an operating temperature and pressure, the method comprising:

compressing the fuel cell stack between a first end plate assembly and an opposite end plate, the end plate assembly comprising a bladder containing a two-phase fluid having a liquid/vapor phase transition at the operating temperature and pressure of the fuel cell stack.

22. The method of claim 21 wherein said two-phase fluid comprises a vapor pressure between about 25 psi and about 1000 psi at a temperature between about 20 degrees C. to about 110 degrees C.

23. The method of claim 21 wherein the end plate comprises a second end plate assembly having a second bladder containing a two-phase fluid having a liquid portion and a vapor portion.

24. The method of claim 21 further comprising evacuating the bladder and introducing the two-phase fluid into the bladder.

* * * * *

UNITED STATES PATENT AND TRADEMARK OFFICE
CERTIFICATE OF CORRECTION

| | |
|---|---|
| PATENT NO. | : 6,200,698 B1 |
| DATED | : March 13, 2001 |
| INVENTOR(S) | : Carlstrom, Jr. |

It is certified that error appears in the above-identified patent and that said Letters Patent is hereby corrected as shown below:

<u>Column 1,</u>
Line 6, delete "DE.FC01.97EE50472" and replace with -- DE-FC02-97EE50472 --

<u>Column 6,</u>
Line 65, delete "9" and replace with -- 19 --.

Signed and Sealed this

Fifteenth Day of January, 2002

Attest:

JAMES E. ROGAN
*Director of the United States Patent and Trademark Office*

*Attesting Officer*